June 2, 1931.    M. E. BENESH    1,808,283
THERMOSTAT
Filed Dec. 22, 1927
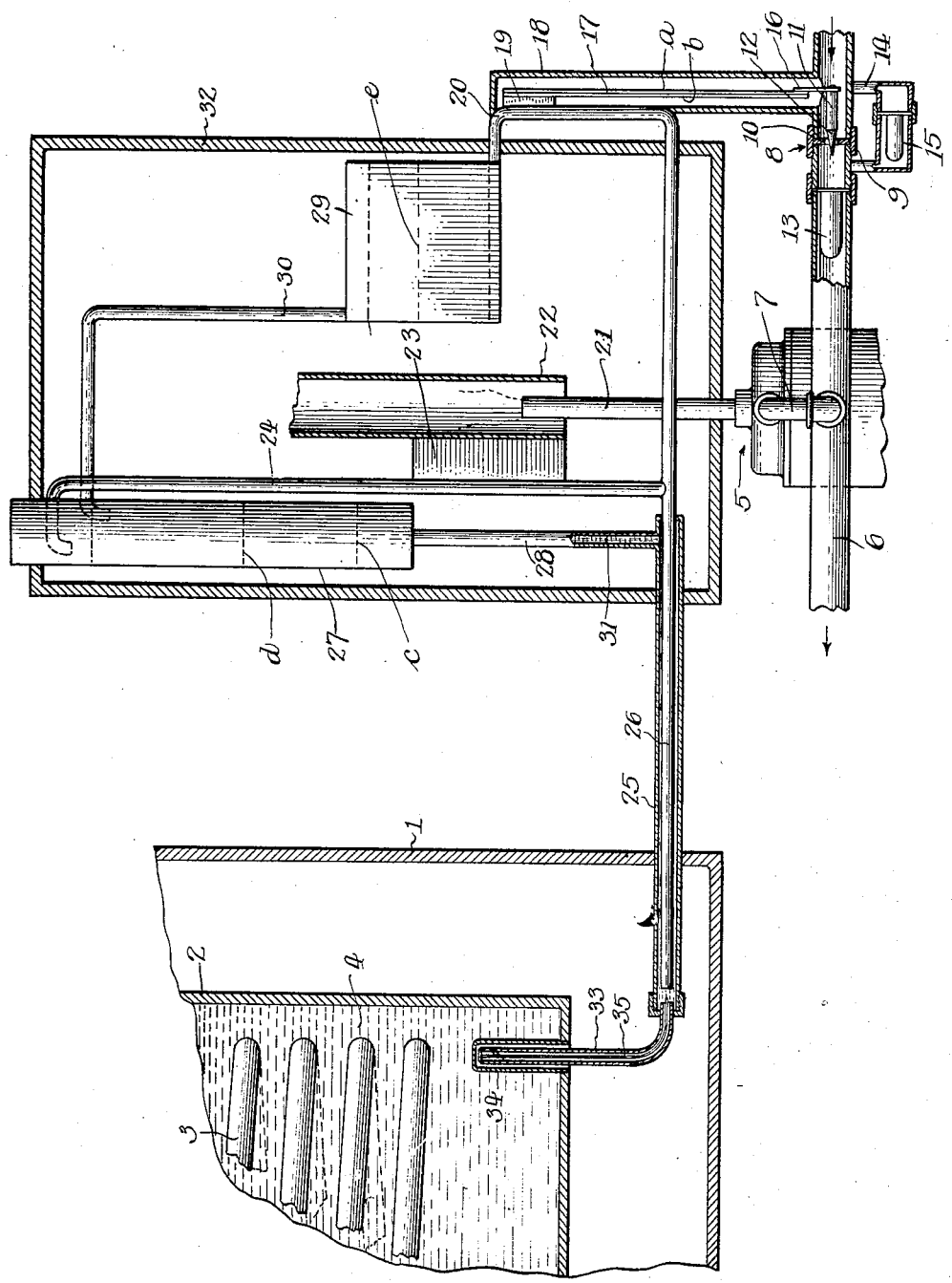
Inventor
Matthew E. Benesh,
By Chindahl Parker Carlson
Attys.

Patented June 2, 1931

1,808,283

UNITED STATES PATENT OFFICE

MATTHEW E. BENESH, OF CICERO, ILLINOIS

THERMOSTAT

Application filed December 22, 1927. Serial No. 241,755.

The present invention relates to improvements in thermostats, and more particularly thermostats for automatically maintaining certain predetermined conditions, such as the desired temperature.

An important object of the invention resides in the provision of a novel thermostat which is affected by a small, well-defined and constant range in the temperature under control, to make available a very wide range of temperature for actuating the thermostatic element. A thermostat of this type is disclosed in my copending application, Serial No. 154,052 filed December 11, 1926.

Another object of the invention resides in the provision of a novel thermostat for maintaining a predetermined temperature in a body, which comprises a heating unit having a high thermal head, a thermostatic element, and a convection medium for dissipating heat from said unit to said body when the temperature in said body is above a predetermined point, and to said thermostatic element when the temperature in said body is below said predetermined point.

A more specific object resides in the provision of a thermostat in which the change of state of a convection medium serves to divert a substantial flow of heat under a high thermal head to or from a thermostatic element.

A further object is to provide a seeding means for the convection medium in a thermostat of the above character, the seeding means being exposed to a temperature lower than the one to be maintained, and serving to prevent super-cooling of the convection medium.

A specific object of the invention resides in the provision of a novel thermostat in which circulation of a convection medium through one circuit exposed to the temperature to be controlled when the medium in said circuit is fluid, and through another circuit adapted to carry heat to a thermostatic element when the medium in said first mentioned circuit is frozen, is caused by percolating the medium.

Another object of the invention is to provide a new and improved thermostat which is simple and inexpensive in construction, and which is sensitive and efficient in operation.

A further object resides in the provision of a novel self-cleaning gas valve.

Further objects and advantages will become apparent as the description proceeds.

In the accompanying drawing, the figure is a view partially in section of a thermostat embodying the features of my invention.

While the invention is susceptible of various modifications and alternative constructions, I have shown in the drawing and will herein describe in detail the preferred embodiment thereof, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment shown in the drawing, the thermostat is adapted to control the temperature in a chamber 1 which in the present instance is a refrigerated chamber, refrigerated through the use of a gas burner in a well-known manner (not disclosed). In the present instance, I have shown a refrigerating tank 2 within the chamber 1, and enclosing suitable cooling coils 3 immersed in brine 4. The gas burner for producing refrigeration may be the gas burner 5, or any other suitable burner (not shown). The thermostat, although especially adapted for use in refrigerators, is suitable for many other uses, and it is to be understood that such uses are contemplated as falling within the invention.

Fuel is supplied to the burner not shown and/or the burner 5 through a fuel main 6, the burner 5 being connected to the main 6 by a pipe 7. The flow of fuel through the main 6 is controlled by a valve 8 which comprises a contraction 9 interposed in the main 6 and formed with a central valve port 10. A needle valve 11 having a pointed guide end 12 extends through the port 10, and is adapted to completely close the port. The needle valve 11 has a diameter slightly less than the port 10, and hence serves to clean the latter when closing same.

The flow of fuel through the main 6 is limited by a suitable filter 13 disposed in the main. The capacity of flow through the port 10 is greater than through the filter 13. To provide a small limited flow of fuel when the valve 8 is closed, a small by-pass line 14 connects the main 6 at opposite sides of the valve. The flow of fuel through the by-pass line 14 is controlled by a suitable filter 15. It will be evident that when the valve 8 is open a maximum flow of fuel will result and that when the valve is closed a minimum flow of fuel will result. Change in flow is effective through the refrigerating means (not shown in full and forming no part of the present invention) to change the refrigeration in the chamber 1.

The needle valve 11 is mounted on a leaf spring 16 secured to the free end of a bi-metallic thermostatic element 17, which comprises two metal strips $a$ and $b$ having different coefficients of expansion so that changes in temperature will cause the free end to move laterally. The thermostatic element 17 extends upwardly into an elongated cylindrical shell 18 which is closed at its upper end, and which opens at its lower end into the main 6. The upper end of the thermostatic element 17 is secured to a heat conducting block 19 mounted on a pipe 20.

The burner 5 is adapted to provide a wide temperature change for the thermostatic element 17 when the temperature in the chamber 1 passes through a small, well defined predetermined range. The burner 5 comprises a burner tube 21 which extends into an elongated cylindrical chimney 22 mounted on a heat conducting block 23. The latter is mounted on a pipe 24.

Means is provided for carrying away or dissipating heat from the burner 5, either mainly toward the refrigerating chamber 1 or to the thermostatic element 17, depending upon the temperature in the chamber 1. This means comprises a convection medium unit which is exposed to the refrigeration in the chamber 1. The unit may have any suitable or preferred form, and in the present instance comprises an outer pipe 25 which extends into the chamber 1, and which is closed at its end, and an inner pipe 26 which terminates at the inner end of the outer pipe, and which extends through the outer end wall of the outer pipe. The pipes 25 and 26 form a heat exchanger. The pipe 26 connects with the pipes 20 and 24. The upper end of the pipe 24 opens into the upper end of a closed reservoir 27 of which the lower end is connected by a pipe 28 to the outer end of the pipe 25. The pipe 20 opens into the lower end of a closed reservoir 29 which has a larger capacity than the reservoir 27, and which is positioned below the latter. A pipe 30 opens into the upper end of the reservoir 29, extends upwardly therefrom and opens into the upper end of the reservoir 27 at a point a little below the outlet of the pipe 24.

The pipes and reservoirs form a closed circulating system for a suitable fluid 31 which will freeze at or near the temperature to be maintained in the chamber 1. In refrigeration, benzol is a suitable fluid. Preferably the system is sealed up without any permanent gases.

To maintain the fluid 31, excepting that in or returning from the chamber 1, relatively warm, the reservoirs 27 and 29, the connecting pipes, and the heating unit are enclosed within a suitable heat insulating chamber 32. However, the upper end of the reservoir 27 and the thermostatic element 17 and mounting therefor are not enclosed, and are thus kept relatively cool by the radiation.

To insure actual freezing of the liquid at its freezing temperature, seeding means is provided. Preferably this means comprises a seeding tube 33 of which one end opens into the inner end of the outer tube 25 and the other end extends vertically into a pocket 34 in the tank 2. A suitable wick 35 is disposed in the tube 33, and extends into the pipe 25 so as to ensure that some of the fluid 31 is present in the upper end of the tube at all times. The temperature within the tank 2 is obviously lower than that in the chamber 1, and is lower than the freezing temperature of the fluid 31 in the system. Hence the fluid in the seeding tube will be partially frozen and frozen crystals therefrom will feed into the inner end of the pipe 25 to seed the fluid in the pipe. It will be evident that by seeding the fluid, super-cooling cannot take place.

In operation, when the system is cold, the fluid assumes a level indicated at $c$. To start the system, the burner 5 is started. Heat from the burner 5 transmitted through the block 23 to the pipe 24 will cause vaporization of the fluid in the pipe 24. The vaporized fluid with a liberal amount of entrained liquid will be discharged into the reservoir 27 and there the vapor is condensed. As a result, the liquid in the reservoir 27 will rise approximately to the level $d$ and the liquid in the reservoir 29 will fall to the level $e$. The head of the fluid in the reservoir 27 causes circulation through the pipe 25 to the chamber 1, and back through the pipe 26 to the pipe 24. The fluid returning through the pipe 26 is relatively cold. When the temperature in the chamber 1 falls below the freezing point of the fluid, the latter will freeze and will stop circulation through the pipes 25 and 26. Fluid from the reservoir 29 will then be drawn into the pipe 24, and evaporated into the reservoir 27 until the liquid in the latter reaches the effective inlet of the pipe 30. Condensate from the reservoir 27 will now overflow through the pipe 30 into the reservoir. Circulation of the hot condensate through the pipe 20 causes a sudden and appreciable rise in the temperature of the thermostatic element, and thus causes the valve 8 to close to reduce the refrigeration in the chamber.

I claim as my invention:

1. A thermostat having, in combination, a fluid line for supplying fluid to control the temperature of a body, a valve in said line, a thermostatic element connected to said valve, a source of heat, said source being constantly available regardless of variations in the flow of fluid through said line, and means for carrying heat by convection from said source to said element, said means being subject to said temperature and being effective when said temperature passes through a relatively small predetermined range to vary the flow of heat to said element over a relatively wide range so as to actuate said element.

2. A thermostat having, in combination, a thermostatic element adapted to control the temperature of a body, a source of heat, and a convection medium for continuously dissipating heat from said source, said medium being adapted to be exposed to said temperature and being adapted to carry heat under a high thermal head to said element only when said temperature is on one side of a predetermined range.

3. A thermostat having, in combination, a thermostatic element, a source of heat and a convection medium for carrying heat from said source, said medium being adapted upon a change of state to cause a substantial flow of heat under a high thermal head to said element or to divert such flow depending upon the specific character of the change.

4. A thermostat having, in combination, a thermostatic element, a source of heat, a convection medium for dissipating heat from said source, said medium being adapted upon a change of state to cause a substantial flow of heat under a high thermal head to said element or to divert such flow, and means for seeding said medium to ensure a change of state at said temperature.

5. A thermostat having, in combination with a fluid line, a valve in said line, a thermostatic element connected to said valve for actuating the latter, a source of heat and temperature control means for dissipating heat, said means being effective to cause a relatively large flow of heat by convection under a heavy head from said source to said element when the temperature is on one side of a predetermined range, and being adapted to divert said flow of heat to other channels when said temperature is on the other side of said range.

6. A thermostat having, in combination, a thermostatic element, a source of heat, a closed reservoir, a supply pipe, the upper end of which opens into said reservoir, means for conducting heat from said source to said supply pipe, a circulating line exposed to the temperature to be maintained, said line opening into the lower end of said reservoir and connecting with the lower end of said supply pipe, a second circulating line opening from the upper end of said reservoir and below the outlet of said supply pipe and connecting with the lower end of said supply pipe, an auxiliary reservoir in said second line having a larger capacity and a lower head than said first mentioned reservoir, and means for conducting heat from said second circulating line to said thermostatic element.

In testimony whereof, I have hereunto affixed my signature.

MATTHEW E. BENESH.